US010243916B2

(12) United States Patent
Mahajan et al.

(10) Patent No.: US 10,243,916 B2
(45) Date of Patent: Mar. 26, 2019

(54) CONTROL PLANE BASED TECHNIQUE FOR HANDLING MULTI-DESTINATION TRAFFIC IN OVERLAY NETWORKS

(71) Applicant: CISCO TECHNOLOGY, INC., San Jose, CA (US)

(72) Inventors: Mehak Mahajan, San Jose, CA (US); Samir D. Thoria, Saratoga, CA (US); Shyam Kapadia, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 399 days.

(21) Appl. No.: 15/093,541

(22) Filed: Apr. 7, 2016

(65) Prior Publication Data

US 2017/0295130 A1    Oct. 12, 2017

(51) Int. Cl.
G06F 9/455 (2018.01)
H04L 12/46 (2006.01)
H04L 29/08 (2006.01)
H04L 29/12 (2006.01)

(52) U.S. Cl.
CPC ........ H04L 61/103 (2013.01); G06F 9/45558 (2013.01); H04L 12/4641 (2013.01); H04L 67/2842 (2013.01); G06F 2009/45595 (2013.01)

(58) Field of Classification Search
CPC ....... G06F 9/45558; G06F 2009/45595; H04L 61/103; H04L 12/4641; H04L 67/2842
See application file for complete search history.

(56) References Cited

U.S. PATENT DOCUMENTS

| | | |
|---|---|---|
| 2013/0170490 A1 | 7/2013 | Kreeger et al. |
| 2014/0281075 A1 | 9/2014 | Hollis |
| 2015/0215265 A1 | 7/2015 | Lim |
| 2015/0236871 A1 | 8/2015 | Kang |
| 2015/0381494 A1* | 12/2015 | Cherian ................. H04L 45/745 370/392 |
| 2016/0036697 A1 | 2/2016 | DeCusatis et al. |
| 2016/0226762 A1* | 8/2016 | Zhang .................... H04L 49/25 |
| 2017/0099187 A1* | 4/2017 | Dale .................... H04L 41/0893 |
| 2018/0219773 A1* | 8/2018 | Li ............................ H04L 45/64 |

* cited by examiner

*Primary Examiner* — Larry D Donaghue
(74) *Attorney, Agent, or Firm* — Polsinelli PC (57) ABSTRACT

A method is provided in one example embodiment and includes receiving at a controller an Address Resolution Protocol ("ARP") packet from a source VXLAN Tunnel End Point ("VTEP") serving a source host and identifying a destination, the source VTEP having assigned thereto a Virtual Network Identifier ("VNI") identifying a VXLAN network to which the source VTEP and a plurality of other VTEPs belong, the ARP packet being received by the controller via a control plane; determining whether the received ARP packet is a request message; and, if the received ARP packet is a request message, determining whether address information for the identified destination is stored in a cache of the controller.

20 Claims, 6 Drawing Sheets

CONTROL PLANE BASED TECHNIQUE FOR HANDLING MULTI-DESTINATION TRAFFIC IN OVERLAY NETWORKS

TECHNICAL FIELD

This disclosure relates in general to the field of network communications and, more particularly, to embodiments for implementing a control plane based technique for handling multi-destination traffic in data center networks with overlays.

BACKGROUND

A typical Virtual eXtensible Local Area Network ("VXLAN") network comprises a leaf-spine architecture with servers connected to the leaf node devices and IP underlay connections between the leaf and spine node devices. Each leaf node device hosts a VXLAN Tunnel End Point ("VTEP") that is responsible for encapsulation and decapsulation of VXLAN packets. A 24-bit identifier referred to as a Virtual Network Identifier ("VNI") uniquely identifies a VXLAN network. VXLAN employs a MAC-over-IP/UDP scheme that operates over an IP underlay network. This enables all of the advantages of a layer 3 ("L3") network to be retained while providing the flexibility of stretching layer 2 ("L2") segments over L3 networks. Multi-destination traffic is forwarded through the IP core, either via IP multicast or via ingress replication. Ingress replication may be the preferred mode of operation for customers who do not want to run any multicast protocols in the IP underlay.

In case of ingress replication in VXLAN networks, the ingress VTEP device creates n−1 copies of a multi-destination packet, where n is the number of VTEPs in the flood domain (BD or layer-2 VNI). Hence the network can be stressed for bandwidth in networks that have a significant amount of multi-destination traffic. This is especially true when the VNI spans a large number of VTEPs. In addition, the underlay sees a lot of copies (one destined to each VTEP) for a multi-destination packet. Hence, it is desirable to prevent these copies from being flooded into the underlay.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving at a controller an Address Resolution Protocol ("ARP") packet from a source VXLAN Tunnel End Point ("VTEP") serving a source host and identifying a destination, the source VTEP having assigned thereto a Virtual Network Identifier ("VNI") identifying a VXLAN network to which the source VTEP and a plurality of other VTEPs belong, the ARP packet being received by the controller via a control plane; determining whether the received ARP packet is a request message; and, if the received ARP packet is a request message, determining whether address information for the identified destination is stored in a cache of the controller. The method further includes, if the destination address information is stored in the cache of the controller, sending a proxy ARP response to the source VTEP via the control plane, in which the proxy ARP response includes the destination address information; and if the destination address information is not stored in the cache of the controller, sending the request message to each one of the plurality of other VTEPs having the same VNI as the source VTEP via the control plane.

In some embodiments, the method may also include, if the received ARP packet is not a request message, determining whether the received ARP packet is a response message; and if the received ARP packet is a response message, updating the cache of the controller to include the destination address information contained in the response message and sending the response message to the source VTEP via the control plane. The method may further include determining whether the received ARP packet is a gratuitous ARP ("GARP") message indicating a virtual machine ("VM") move; and if the received ARP packet is a GARP message indicating a VM move, updating the controller cache with VM address information included in the GARP message and forwarding the GARP message to the plurality of other VTEPs having the same VNI as the source VTEP via the control plane. Additionally, the method may include, if the received ARP packet is a GARP message that does not indicate a VM move, forwarding the GARP message to the plurality of other VTEPs having the same VNI as the source VTEP via the control plane. In certain embodiments, the control plan may be implemented as an OpenFlow control plane and the controller may be implemented as an OF Software Defined Network ("SDN") controller. In some embodiments, upon receipt of the proxy ARP response from the controller, the source VTEP decapsulates the proxy ARP response and forwards the decapsulated proxy ARP response to the source host. In other embodiments, upon receipt of the response message from the controller, the source VTEP decapsulates the response message and forwards the decapsulated response message to the source host. In still other embodiments, upon receipt of a request message from the controller, each one of the plurality of other VTEPs having the same VNI as the source VTEP decapsulates the request message and floods the decapsulated request message on all server ports of the VTEP having the same VNI as the source VTEP.

Example Embodiments

Figure 1:
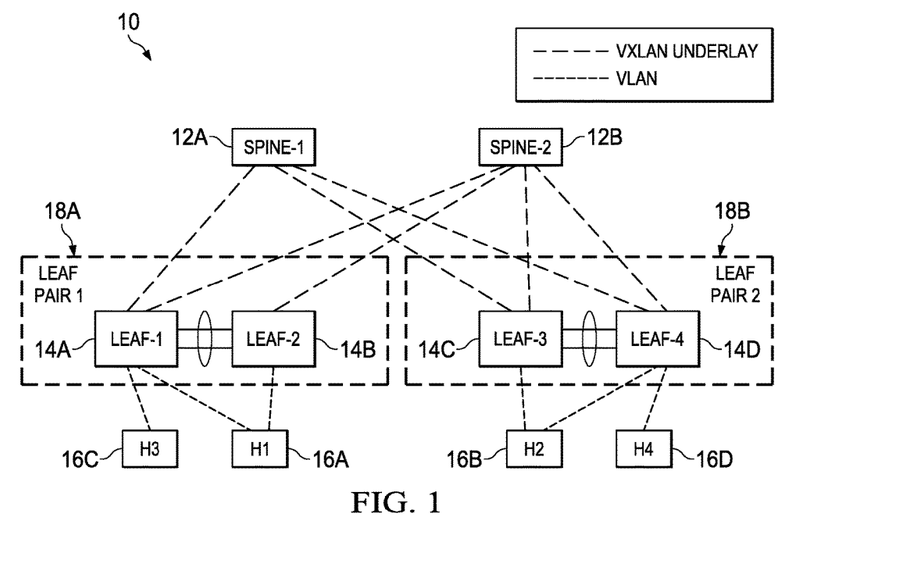
FIG. 1 is a simplified block diagram of a communications network in which conventional techniques for handling multi-destination traffic in overlay networks may be implemented.

FIG. 1 illustrates a conventional communications network 10 comprising a VXLAN network that includes spine nodes 12A and 12B connected to leaf nodes 14A-14D via IP underlay connections 16. In one embodiment, spine nodes 12A, 12B, are implemented using switching devices and function as an aggregation layer. Similarly, leaf nodes 14A-14D may also be implemented using switching devices and function as an access layer. Each of the leaf nodes 14A-14D includes a VTEP responsible for encapsulation and decapsulation of VXLAN packets received from and destined for hosts 16A-16D (and ultimately virtual machines ("VMs") that reside on the hosts) connected thereto. Each host 16A-16D may be implemented as a computer device, such as a server, and may include appropriate hardware and software for implementing one or more VMs. In the illustrated embodiment, leaf nodes 14A and 14B constitute a leaf pair 18A and leaf nodes 14C and 14D constitute a leaf pair 18B. In the illustrated embodiment, host 16A is multi-homed to leaf nodes 14A and 14B, host 16B is multi-homed to leaf nodes 14C and 14D, host H3 is single homed to leaf node 14A, and host 16D is single homed to leaf node 14D. It will be assumed for the sake of example that all of the devices illustrated in FIG. 1 as comprising part of the network 10 have the same VNI.

The most common source of multi-destination traffic in IP networks, such as the network 10, is Address Resolution Protocol ("ARP"); specifically ARP requests including Gratuitous ARP ("GARP") messages. ARP is a network layer protocol that is used to resolve an IP address into a physical address, such as a MAC address. A host wishing to obtain a physical address broadcasts an ARP request onto a TCP/IP network. The host on the network that has the IP address in the request replies with its physical hardware address. ARP may be used as a simple announcement protocol, which may be useful for updating a host's mappings of a hardware address when a sender's (e.g., a VM's) IP address or MAC address has changed. Such an announcement, or GARP message, is usually broadcast as an ARP request containing the sender's protocol address in the target field, with the target hardware address set to zero. An alternative is to broadcast an ARP reply with the sender's hardware and protocol addresses duplicated in the target fields. A GARP message is not intended to solicit a reply; rather, it updates any cached entries in the ARP tables of hosts that receive the packet. Many OSes may send GARP messages during startup, which helps resolve problems that would otherwise occur if a network card was recently changed, for example, and other hosts still have the old mapping in their ARP caches. GARP messages may also be used by some interface drivers to provide load balancing for incoming traffic. In a group of network cards, it may be used to announce a different MAC address within the group that should receive incoming packets.

Both network nodes, such as spine nodes 12A and 12B and leaf nodes 14A-14D, and hosts, such as hosts 16A-16D, rely on ARP packets to populate their ARP caches. For example, when host 16A wants to communicate with host 16B, it sends out an ARP request to resolve the MAC address associated with host 16B. In the embodiment illustrated in FIG. 1, the ARP request is sent to all of the hosts 16B-16D in the VNI (i.e., the flood/broadcast domain). In this manner, the destination host (host 16B) will receive the ARP request, update its ARP cache with the MAC address of the host 16A, and send out a unicast ARP response to the host 16A. Upon receipt of the response, the source host 16A populates its ARP cache with the MAC address of the destination host 16B, enabling IP communication to ensue. Similarly, when a new virtual machine ("VM") comes online, either the VM or a virtual switch may send out a GARP message to all of end devices in the VNI to inform the network about its new IP and MAC address.

In addition, GARP messages may also be sent out on a VM move event. This is imperative in deployments in which servers perform source MAC (SMAC) Network Address Translation ("NAT") at the virtual switch so that traffic originated from the VMs reaches the top of rack ("ToR") with the server MAC, as opposed to the VM MAC, as the source MAC in the Ethernet header. The virtual switches perform IP-based lookup to ensure that the traffic ingressing the server is destined for the correct VM. A problem with SMAC NAT is that remote VMs in the same VLAN/VNI that are in conversation with a given VM will store the (VM-IP, Server-MAC) entry its ARP cache. If the VM moves to another server, the VM-IP is associated with the new-Server-MAC so the ARP cache entries in the remote VMs must be updated to prevent disruption of communication to/from the relocated VM. Typically, post-VM move, a GARP flood on behalf of the moved VM ensures that this update occurs at all remote VMs.

In case of ingress replication in VXLAN networks, the ingress VTEP device at the leaf node creates n−1 copies of a multi-destination packet including GARP/ARP requests, where n is the number of VTEPs in the flood domain (BD or layer-2 VNI). Hence the network can be stressed for bandwidth in networks that have a significant amount of multi-destination traffic. This is especially true when the VNI spans a large number of VTEPs . . . . In addition, the underlay sees a lot of copies (one destined to each VTEP) for a multi-destination packet. Hence, it is desirable to prevent these copies from being flooded into the underlay.

In accordance with features of embodiments described herein, a control plane based technique for handling multi-destination traffic, such as GARP/ARP requests, in overlay networks, is proposed. In such embodiments, GARP/ARP requests may be handled by leveraging an appropriate control plane, which may be a protocol such as BGP-EVPN or controller-based. In one aspect, all remote VTEPs in the same VNI are informed using a control plane that a GARP/ARP request has been received on one of the VTEP devices. Each remote VTEP device can then locally generate a GARP/ARP message and flood it on all local server ports. The ARP response is a unicast packet that can be forwarded along the data plane. In the case of a VXLAN network that uses a controller to distribute host reachability information (as opposed to protocol as BGP-EVPN running on Leafs to distribute host reachability information), the ingress VTEP device sends the GARP/ARP packet to the controller, which may be an OpenFlow-based SDN controller to which GARP/ARP packets can be OpenFlow ("OF") encapsulated and transmitted. The controller then informs all other VXLAN VTEP devices in the same VNI about the GARP/ARP message via the OF channel. Each VTEP device then generates a GARP/ARP request on behalf of the sending host and floods it to the server/edge ports in the same VNI.

In this manner, there is no burden to generate n−1 copies on the ingress VTEP device for every GARP/ARP packet in the forwarding plane. Because the GARP/ARP packets are sent to the controller, potential optimizations are possible where an ARP response may be sent out from the controller itself as a proxy for the destination host if the controller is aware of the MAC address of the destination host. The controller will also be able to distinguish a VM coming up versus a VM move scenario, both of which result in a GARP notification being sent to the network. In the first case, the GARP notification is sent over OF to all of the remote VTEP devices in the same VNI. This in turn will trigger GARPs from the VTEP devices toward the server ports that will end up fixing the ARP cache of the other hosts, especially in cases in which servers perform SMAC NAT, that were in conversation with the VM prior to the move. The same technique may be extended to handle other multi-destination traffic, such as IPv6 ND messages, for example.

It will be noted that OpenFlow enables network controllers to determine the path of network packets across a network of switches. Separation of the control plane from the forwarding plane allows for more sophisticated traffic management than is feasible using access control lists ("ACLs") and routing protocols. OpenFlow also allows switches from different vendors to be managed remotely using a single, open protocol. OpenFlow is an enabler of Software Defined Networking ("SDN"). In general, OpenFlow enables remote provisioning and administration of the packet forwarding tables of an L3 switch by adding, modifying, and removing packet matching rules and actions. In this manner, routing decisions can be made by the controller and translated into rules and actions that may have a user-configurable lifespan. The rules and actions are deployed to the flow table of a switch. Matched packets are forwarded by the switch at wire speed for the duration of the rules. Unmatched packets are forwarded to the controller, which may decide to modify existing flow table rules on one or more switches or to deploy new rules; it may even decide to forward the traffic itself, provided that it has received the entire packet and not just the header from the switch.

Figure 2:
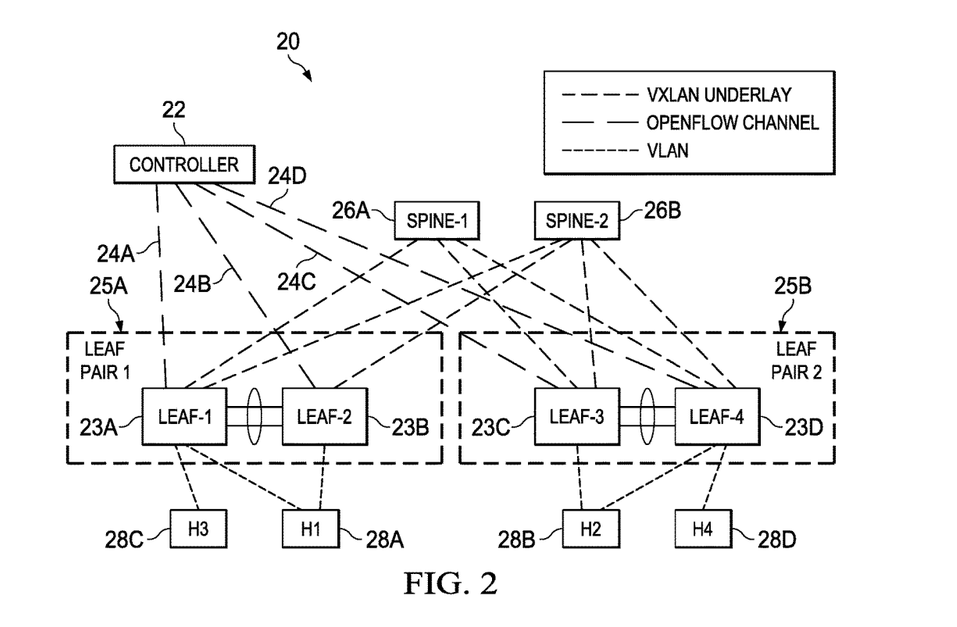
FIG. 2 is a simplified block diagram of a communications network in which techniques for handling multi-destination traffic in overlay networks in accordance with embodiments described herein may be implemented.

FIG. 2 illustrates a communications network 20 in which techniques for handling multi-destination traffic in overlay networks in accordance with embodiments described herein may be implemented. As shown in FIG. 2, the network 20 includes a controller 22, which may be implemented as an OF-based SDN controller, connected to leaf nodes 23A-23D via OF channels 24A-24D. Leaf nodes 23A-23D form two pairs (25A, 25B) of ToR switches interconnected via spine nodes 26A, 26B, to form a VXLAN network. It will be assumed for the sake of example that a first set of hosts 28A-28D, as well as the VMs residing thereon, belong to the same VNI or virtual network segment. It will be further assumed for the sake of example that a VM on the host 28C generates a GARP message. Upon receipt of the GARP message the leaf node 23A OF encapsulates the message and forwards the encapsulated GARP message to the controller 22 via an OF channel 24A. The controller 22 will inform leaf node 23C about the received GARP via an OF. The leaf node 23C will generate a GARP to host 28B, as well as to the leaf node 23D over an inter-chassis link. The packet will then be flooded to host 28D from leaf node 23D. As a result, all of the hosts 28A-28D receive the GARP to populate their ARP caches.

The same procedure will be followed in general for ARP requests with intelligent filtering (proxy, etc.) performed at the controller 22 that will ensure that only GARP/ARP requests that really need to be sent to all VTEP devices are forwarded over the OF channel. In addition, the updates to the leaf VTEP devices can be batched, further reducing the messaging overhead. Since the multi-destination traffic, such as ARP messages, is redirected to the controller from the ingress VTEP, the underlay links do not see them, thereby providing huge savings in bandwidth while handling multi-destination traffic.

Figure 3:
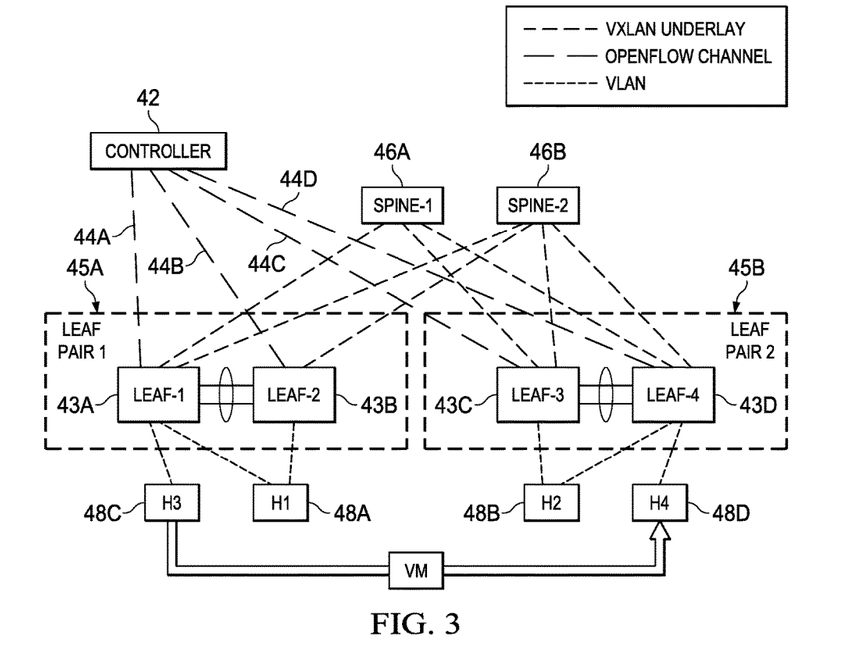
FIG. 3 is another simplified block diagram of a communications network in which techniques for handling multi-destination traffic in overlay networks in accordance with embodiments described herein may be implemented.

Referring now to FIG. 3, illustrated therein is a communications network 40 in which techniques for handling multi-destination traffic in overlay networks in accordance with embodiments described herein may be implemented. As shown in FIG. 3, and similar to the network 20 of FIG. 2, the network 40 includes a controller 42, which may be implemented as an OF-based SDN controller, connected to leaf nodes 43A-43D via OF channels 44A-44D. Leaf nodes 43A-43D form two pairs (45A, 45B) of ToR switches interconnected via spine nodes 46A, 46B, to form a VXLAN network. It will be assumed for the sake of example that a first set of hosts 48A-48D, as well as the VMs residing thereon, belong to the same VNI or virtual network segment.

In the example illustrated in FIG. 3, it will be assumed that a VM residing on the host 48C is moved to host 48D. As previously noted, GARPs may be sent out on a VM move event. This is imperative in deployments in which servers perform SMAC Network Address Translation ("NAT") at the virtual switch so that traffic originated from the VMs reaches the top of rack ("ToR") with the server MAC, as opposed to the VM MAC, as the source MAC in the Ethernet header. The virtual switches perform IP-based lookup to ensure that the traffic ingressing the server is destined for the correct VM. A problem with SMAC NAT is that remote VMs in the same VLAN/VNI that are in conversation with a given VM will store the (VM-IP, Server-MAC) entry its ARP cache. If the VM moves to another server, the VM-IP is associated with the new-Server-MAC so the ARP cache entries in the remote VMs must be updated to prevent disruption of communication to/from the relocated VM. Typically, post-VM move, a GARP flood from the new VTEP on behalf of the moved VM ensures that this update occurs at all remote VMs. In accordance with features of embodiments described herein, upon the move of the VM from host 48C to host 48D, rather than flooding a GARP message from leaf node 43D directly to the other leaf nodes, the GARP message is OF encapsulated and sent to the controller 42 via OF channel 44D.

Upon receipt of the GARP message, the controller 42 is able to determine from the packet that the GARP message was sent as the result of a VM move due to the fact the MAC address for the VM does not match the MAC address stored in controller's cache. The controller 42 updates its cache and then sends a GARP message to the other leaf nodes in the VNI via OF channel signaling.

Figure 4:
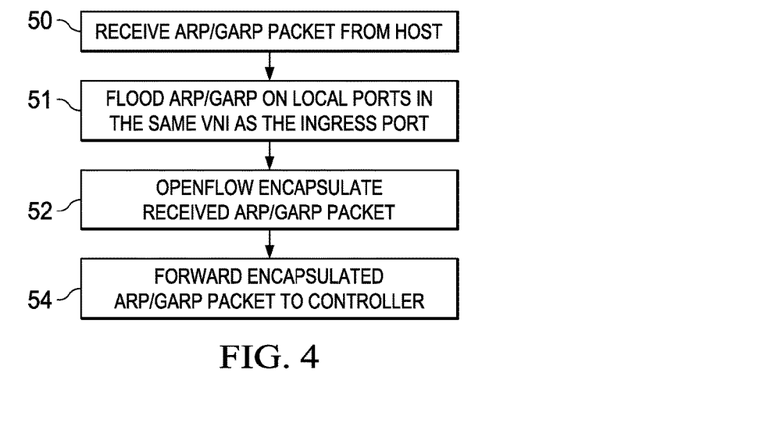
FIGS. 4-6 are flowcharts illustrating processes that may be performed by an element of a communications network in which techniques for handling multi-destination traffic in overlay networks in accordance with embodiments described herein may be implemented.

FIG. 4 is a flowchart of a process that may be performed by a leaf node, such as leaf nodes 23A-23D, 43A-43D, in accordance with features of embodiments described herein, upon receipt of an ARP/GARP packet from a host. Referring to FIG. 4, in step 50, the node receives an ARP/GARP packet from a host connected thereto. In step 51, flood ARP/GARP packet on local ports in the same VNI as the ingress port. In step 52, the node OF encapsulates the received packet and then forwards the encapsulated packet to the controller via OF signaling in step 54. It will be noted that steps 52 and 54 are performed instead of ingress replication previously requiring the node to replicate the packet and forward it via the forwarding plane to the other leaf nodes in the same VNI.

Figure 5:
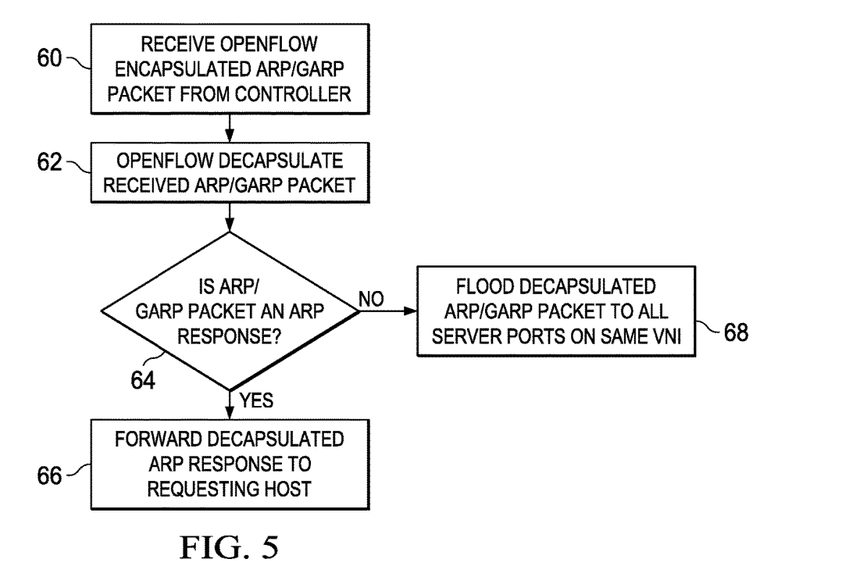

FIG. 5 is a flowchart of a process that may be performed by a leaf node, such as leaf nodes 23A-23D, 43A-43D, in accordance with features of embodiments described herein, in response to receipt of an OF encapsulated ARP/GARP packet from the controller. Referring to FIG. 5, in step 60, a leaf node receives an OF encapsulated ARP/GARP packet from the controller. In step 62, the leaf node decapsulates the received packet. In step 64, a determination is made whether the received packet is an ARP response packet. If so, execution proceeds to step 66, in which the decapsulated ARP response is forwarded to the requesting host. If it is determined in step 64 that the received packet is not an ARP response, execution proceeds to step 68, in which the decapsulated packet is flooded to all server ports of the leaf node on the same VNI.

Figure 6:
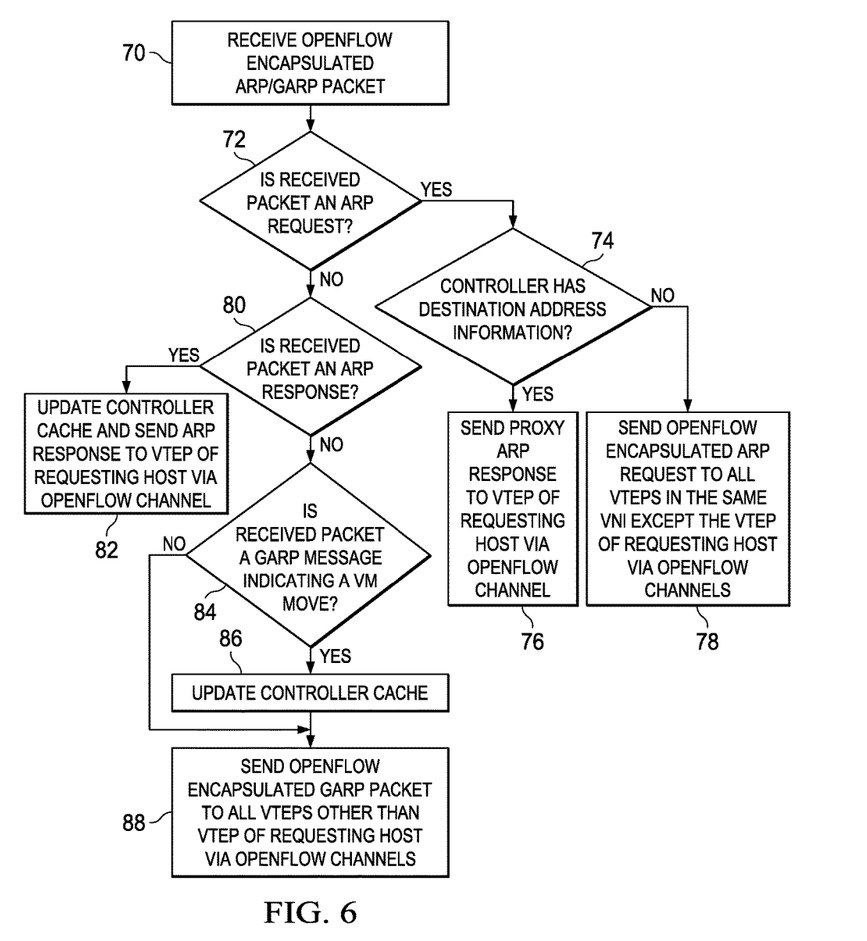

FIG. 6 is a flowchart of a process that may be performed by a controller, such as controller 22, 42, in accordance with features of embodiments described herein in response to receipt of an OF encapsulated ARP/GARP packet from a leaf node. Referring to FIG. 6, in step 70, the controller receives an OF encapsulated ARP/GARP packet. In step 72, a determination is made whether the received packet is an ARP request. If so, execution proceeds to step 74, in which a determination is made whether the controller has MAC address information for the packet destination. If so, execution proceeds to step 76, in which the controller sends a proxy ARP to the VTEP of the requesting host via the OF channel. If a negative determination is made in step 74, execution proceeds to step 78, in which an OF encapsulated ARP request is sent to all VTEPs in the same VNI, except the VTEP of the requesting host, via OF channels.

If a negative determination is made in step 72, execution proceeds to step 80, in which a determination is made whether the received packet is an ARP response. If so, execution proceeds to step 82, in which the controller updates the MAC address of the destination in the controller's cache and sends an ARP response to the leaf node of the requesting host via the OF channel. If a negative determination is made in step 80, execution proceeds to step 84, in which a determination is made whether the received packet is a GARP message indicating a VM move. If so, execution proceeds to step 86, in which the controller's cache is updated with the new MAC address of the VM, and then to step 88, in which an OF encapsulated GARP packet is sent via OF channels to all leaf nodes of the VNI other than the leaf node of the requesting host. If a negative determination is made in step 84, execution proceeds directly to step 88.

In example implementations, at least some portions of the activities related to the techniques described herein may be implemented in software in, for example, a server, a router, etc. In some embodiments, this software could be received or downloaded from a web server, provided on computer-readable media, or configured by a manufacturer of a particular element in order to provide this system in accordance with features of embodiments described herein. In some embodiments, one or more of these features may be implemented in hardware, provided external to these elements, or consolidated in any appropriate manner to achieve the intended functionality.

Figure 7:
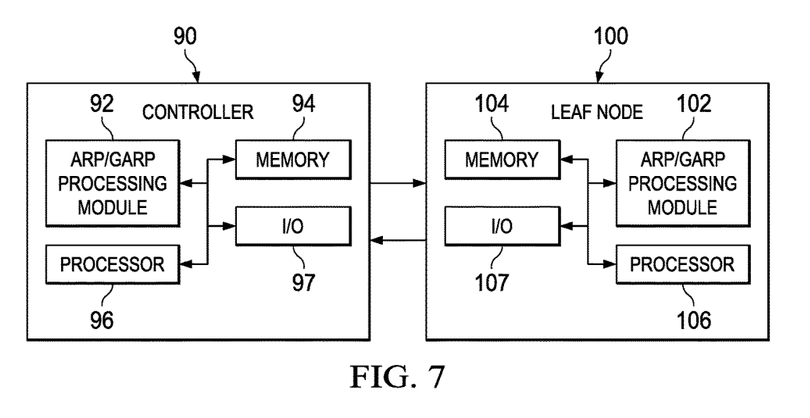
FIG. 7 is a simplified block diagram of a controller and a leaf node that may be implemented in a communications network in which techniques for handling multi-destination traffic in overlay networks in accordance with embodiments described herein may be implemented.

For example, referring to FIG. 7, a controller 90 may include a ARP/GARP processing module 92, which comprises software embodied in one or more tangible media for facilitating the activities described herein. In particular, the ARP/GARP processing module 92 comprises software for facilitating the processes illustrated in and described with reference to FIGS. 4-6. The controller 90 may also include a memory device 94 for storing information to be used in achieving the functions as outlined herein. Additionally, the controller 90 may include a processor 96 that is capable of executing software or an algorithm (such as embodied in module 92) to perform the functions as discussed in this Specification. The controller 90 may also include various I/O 97 necessary for performing functions described herein.

The controller 90 is connected to a plurality of leaf nodes, represented in FIG. 7 by a leaf node 100, which may include an ARP/GARP processing module 102 comprising software embodied in one or more tangible media for facilitating the activities described herein. In particular, the ARP/GARP processing module 102 comprises software for facilitating the processes illustrated in and described with reference to FIGS. 4-6. The leaf node 100 may also include a memory device 104 for storing information to be used in achieving the functions as outlined herein. Additionally, the leaf node 100 may include a processor 106 that is capable of executing software or an algorithm (such as embodied in module 102) to perform the functions as discussed in this Specification. The leaf node 100 may also include various I/O 107 necessary for performing functions described herein.

Although the embodiments are described with reference to wired communications network, it will be recognized that the techniques are equally applicable to other network technologies. In one example implementation, various devices involved in implementing the embodiments described herein can include software for achieving the described functions. For example, the nodes may be implemented using one or more computer devices comprising software embodied in one or more tangible media for facilitating the activities described herein. The computer device for implementing the transmitter and receiver elements may also include a memory device (or memory element) for storing information to be used in achieving the functions as outlined herein. Additionally, the computer device for implementing the transmitter and receiver elements may include a processor that is capable of executing software or an algorithm to perform the functions as discussed in this Specification, including but not limited to the functions illustrated in and described with reference to FIGS. 4-6. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and specifically illustrated in FIGS. 4-6 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIGS. 4-6. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Figure 8:
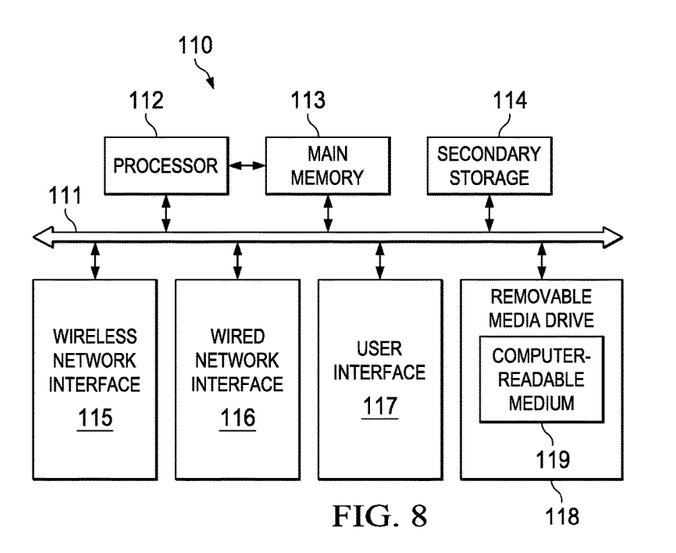
FIG. 8 is a simplified block diagram of a machine comprising an element of a communications network in which techniques for handling multi-destination traffic in overlay networks in accordance with embodiments described herein may be implemented.

Turning to FIG. 8, FIG. 8 illustrates a simplified block diagram of an example machine (or apparatus) 100, which in certain embodiments may be a host, a storage device, or a switch comprising elements of networks 20, 40, that may be implemented a system in accordance with features of embodiments described herein. The example machine 110 corresponds to network elements and computing devices that may be deployed in networks 20, 40. In particular, FIG. 8 illustrates a block diagram representation of an example form of a machine within which software and hardware cause machine 110 to perform any one or more of the activities or operations discussed herein. As shown in FIG. 8, machine 110 may include a processor 112, a main memory 113, secondary storage 114, a wireless network interface 115, a wired network interface 116, a user interface 117, and a removable media drive 118 including a computer-readable medium 119. A bus 111, such as a system bus and a memory bus, may provide electronic communication between processor 112 and the memory, drives, interfaces, and other components of machine 110.

Processor 112, which may also be referred to as a central processing unit ("CPU"), can include any general or special-purpose processor capable of executing machine readable instructions and performing operations on data as instructed by the machine readable instructions. Main memory 113 may be directly accessible to processor 112 for accessing machine instructions and may be in the form of random access memory ("RAM") or any type of dynamic storage (e.g., dynamic random access memory ("DRAM")). Secondary storage 114 can be any non-volatile memory such as a hard disk, which is capable of storing electronic data including executable software files. Externally stored electronic data may be provided to computer 110 through one or more removable media drives 118, which may be configured to receive any type of external media such as compact discs ("CDs"), digital video discs ("DVDs"), flash drives, external hard drives, etc.

Wireless and wired network interfaces 115 and 116 can be provided to enable electronic communication between machine 110 and other machines, or nodes. In one example, wireless network interface 115 could include a wireless network controller ("WNIC") with suitable transmitting and receiving components, such as transceivers, for wirelessly communicating within a network. Wired network interface 116 can enable machine 110 to physically connect to a network by a wire line such as an Ethernet cable. Both wireless and wired network interfaces 115 and 116 may be configured to facilitate communications using suitable communication protocols such as, for example, Internet Protocol Suite ("TCP/IP"). Machine 110 is shown with both wireless and wired network interfaces 115 and 116 for illustrative purposes only. While one or more wireless and hardwire interfaces may be provided in machine 110, or externally connected to machine 110, only one connection option is needed to enable connection of machine 110 to a network.

A user interface 117 may be provided in some machines to allow a user to interact with the machine 110. User interface 117 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 118 represents a drive configured to receive any type of external computer-readable media (e.g., computer-readable medium 119). Instructions embodying the activities or functions described herein may be stored on one or more external computer-readable media. Additionally, such instructions may also, or alternatively, reside at least partially within a memory element (e.g., in main memory 113 or cache memory of processor 112) of machine 110 during execution, or within a non-volatile memory element (e.g., secondary storage 114) of machine 110. Accordingly, other memory elements of machine 110 also constitute computer-readable media. Thus, "computer-readable medium" is meant to include any medium that is capable of storing instructions for execution by machine 110 that cause the machine to perform any one or more of the activities disclosed herein.

Not shown in FIG. 8 is additional hardware that may be suitably coupled to processor 112 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 110 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 110 to appropriately manage the operation of the hardware components therein.

The elements, shown and/or described with reference to machine 110, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein related to techniques for enabling packet prioritization without starvation in data center networks may be implemented in software in, for example, hosts and storage devices. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

In one example implementation, hosts and storage devices are network elements or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 113, secondary storage 114, computer-readable medium 119) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 112) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of the network 20, 40, may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network 20, 40, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving at a controller an Address Resolution Protocol ("ARP") packet from a source VXLAN Tunnel End Point ("VTEP") serving a source host and identifying a destination, the source VTEP having assigned thereto a Virtual Network Identifier ("VNI") identifying a VXLAN network to which the source VTEP and a plurality of other VTEPs belong, the ARP packet being received by the controller via a control plane;
   determining whether the received ARP packet is a request message;
   if the received ARP packet is a request message, determining whether address information for the identified destination is stored in a cache of the controller;
   if the destination address information is stored in the cache of the controller, sending a proxy ARP response to the source VTEP via the control plane, wherein the proxy ARP response includes the destination address information; and
   if the destination address information is not stored in the cache of the controller, sending the request message to each one of the plurality of other VTEPs having the same VNI as the source VTEP via the control plane.

2. The method of claim 1 further comprising:
   if the received ARP packet is not a request message, determining whether the received ARP packet is a response message; and
   if the received ARP packet is a response message, updating the cache of the controller to include the destination address information contained in the response message and sending the response message to the source VTEP via the control plane.

3. The method of claim 2 further comprising:
   determining whether the received ARP packet is a gratuitous ARP ("GARP") message indicating a virtual machine ("VM") move; and
   if the received ARP packet is a GARP message indicating a VM move, updating the controller cache with VM address information included in the GARP message and forwarding the GARP message to the plurality of other VTEPs having the same VNI as the source VTEP via the control plane.

4. The method of claim 3 further comprising, if the received ARP packet is a GARP message that does not indicate a VM move, forwarding the GARP message to the plurality of other VTEPs having the same VNI as the source VTEP via the control plane.

5. The method of claim 1, wherein the control plane comprises an OpenFlow control plane.

6. The method of claim 1, wherein the controller comprises an OpenFlow Software Defined Network ("OF SDN") controller.

7. The method of claim 1, wherein upon receipt of the proxy ARP response from the controller, the source VTEP decapsulates the proxy ARP response and forwards the decapsulated proxy ARP response to the source host.

8. The method of claim 1, wherein upon receipt of the response message from the controller, the source VTEP decapsulates the response message and forwards the decapsulated response message to the source host.

9. The method of claim 1, wherein upon receipt of a request message from the controller, each one of the plurality of other VTEPs having the same VNI as the source VTEP decapsulates the request message and floods the decapsulated request message on all server ports of the VTEP having the same VNI as the source VTEP.

10. One or more non-transitory tangible media having encoded thereon logic that includes code for execution and when executed by a processor is operable to perform operations comprising:
    receiving at a controller an Address Resolution Protocol ("ARP") packet from a source VXLAN Tunnel End Point ("VTEP") serving a source host and identifying a destination, the source VTEP having assigned thereto a Virtual Network Identifier ("VNI") identifying a VXLAN network to which the source VTEP and a plurality of other VTEPs belong, the ARP packet being received by the controller via a control plane;
    determining whether the received ARP packet is a request message;
    if the received ARP packet is a request message, determining whether address information for the identified destination is stored in a cache of the controller;
    if the destination address information is stored in the cache of the controller, sending a proxy ARP response to the source VTEP via the control plane, wherein the proxy ARP response includes the destination address information; and
    if the destination address information is not stored in the cache of the controller, sending the request message to each one of the plurality of other VTEPs having the same VNI as the source VTEP via the control plane.

11. The media of claim 10 wherein the operations further comprise:
    if the received ARP packet is not a request message, determining whether the received ARP packet is a response message; and
    if the received ARP packet is a response message, updating the cache of the controller to include the destination address information contained in the response message and sending the response message to the source VTEP via the control plane.

12. The media of claim 11 wherein the operations further comprise:

determining whether the received ARP packet is a gratuitous ARP ("GARP") message indicating a virtual machine ("VM") move; and if the received ARP packet is a GARP message indicating a VM move, updating the controller cache with VM address information included in the GARP message and forwarding the GARP message to the plurality of other VTEPs having the same VNI as the source VTEP via the control plane.

13. The media of claim 12 wherein the operations further comprise, if the received ARP packet is a GARP message that does not indicate a VM move, forwarding the GARP message to the plurality of other VTEPs having the same VNI as the source VTEP via the control plane.

14. The media of claim 10, wherein upon receipt of the proxy ARP response from the controller, the source VTEP decapsulates the proxy ARP response and forwards the decapsulated proxy ARP response to the source host.

15. The media of claim 10, wherein upon receipt of the response message from the controller, the source VTEP decapsulates the response message and forwards the decapsulated response message to the source host.

16. An apparatus comprising:
a memory element configured to store data;
a processor operable to execute instructions associated with the data; and
an Address Resolution Protocol ("ARP") processing module configured to:
receive at a controller an Address Resolution Protocol ("ARP") packet from a source VXLAN Tunnel End Point ("VTEP") serving a source host and identifying a destination, the source VTEP having assigned thereto a Virtual Network Identifier ("VNI") identifying a VXLAN network to which the source VTEP and a plurality of other VTEPs belong, the ARP packet being received by the controller via a control plane;
determine whether the received ARP packet is a request message;
if the received ARP packet is a request message, determine whether address information for the identified destination is stored in a cache of the controller;

if the destination address information is stored in the cache of the controller, send a proxy ARP response to the source VTEP via the control plane, wherein the proxy ARP response includes the destination address information; and if the destination address information is not stored in the cache of the controller, send the request message to each one of the plurality of other VTEPs having the same VNI as the source VTEP via the control plane.

17. The apparatus of claim 16, wherein the ARP processing module is further configured to:
if the received ARP packet is not a request message, determine whether the received ARP packet is a response message; and
if the received ARP packet is a response message, update the cache of the controller to include the destination address information contained in the response message and sending the response message to the source VTEP via the control plane.

18. The apparatus of claim 17, wherein the ARP processing module is further configured to:
determine whether the received ARP packet is a gratuitous ARP ("GARP") message indicating a virtual machine ("VM") move; and
if the received ARP packet is a GARP message indicating a VM move, update the controller cache with VM address information included in the GARP message and forward the GARP message to the plurality of other VTEPs having the same VNI as the source VTEP via the control plane.

19. The apparatus of claim 18, wherein the ARP processing module is further configured to, if the received ARP packet is a GARP message that does not indicate a VM move, forward the GARP message to the plurality of other VTEPs having the same VNI as the source VTEP via the control plane.

20. The apparatus of claim 16, wherein the control plane comprises an OpenFlow control plane and the controller comprises an OpenFlow Software Defined Network ("OF SDN") controller.

* * * * *